US008558678B2

(12) United States Patent
Van Wiemeersch et al.

(10) Patent No.: US 8,558,678 B2
(45) Date of Patent: Oct. 15, 2013

(54) METHOD AND SYSTEMS FOR DETECTING AN UNAUTHORIZED USE OF A VEHICLE BY AN AUTHORIZED DRIVER

(75) Inventors: John Robert Van Wiemeersch, Novi, MI (US); Robert Bruce Kleve, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 728 days.

(21) Appl. No.: 12/712,682

(22) Filed: Feb. 25, 2010

(65) Prior Publication Data

US 2011/0205040 A1    Aug. 25, 2011

(51) Int. Cl.
*B60R 25/10* (2013.01)
*B60Q 1/00* (2006.01)
*G08B 1/08* (2006.01)

(52) U.S. Cl.
USPC ...... 340/426.1; 340/438; 340/439; 340/539.1

(58) Field of Classification Search
None
See application file for complete search history.

(56) References Cited

U.S. PATENT DOCUMENTS

| 4,804,937 | A | | 2/1989 | Barbiaux |
| 5,355,511 | A | | 10/1994 | Hatano et al. |
| 5,432,841 | A | | 7/1995 | Rimer |
| 5,633,484 | A | | 5/1997 | Zancho et al. |
| 5,654,686 | A | * | 8/1997 | Geschke et al. ......... 340/426.26 |
| 5,732,074 | A | | 3/1998 | Spaur et al. |
| 5,758,300 | A | | 5/1998 | Abe |
| 5,889,468 | A | | 3/1999 | Banga |
| 5,942,979 | A | | 8/1999 | Luppino |
| 5,943,206 | A | | 8/1999 | Crayford |
| 5,963,129 | A | | 10/1999 | Warner |
| 5,986,543 | A | * | 11/1999 | Johnson ................... 340/426.19 |
| 5,993,397 | A | | 11/1999 | Branson |
| 6,025,777 | A | | 2/2000 | Fuller et al. |
| 6,037,676 | A | | 3/2000 | Foree |
| 6,067,009 | A | | 5/2000 | Hozuka et al. |
| 6,104,931 | A | | 8/2000 | Havinis et al. |
| 6,292,095 | B1 | | 9/2001 | Fuller et al. |
| 6,295,449 | B1 | | 9/2001 | Westerlage et al. |

(Continued)

FOREIGN PATENT DOCUMENTS

DE        10225787 A1    12/2003
JP         2005220635      8/2005

OTHER PUBLICATIONS

J. Smith, Wanted: One Gorilla, printed from www.tirereview.com, Jul. 27, 2009.

(Continued)

*Primary Examiner* — Julie Lieu
(74) *Attorney, Agent, or Firm* — Jennifer M. Stec; Brooks Kushman P.C.

(57) ABSTRACT

Various embodiments may include detecting an unauthorized use of a vehicle in the absence of GPS location information. Vehicle component condition data may be received for one or more vehicle components. Historical vehicle component condition data for the one or more vehicle components may also be received. A comparison between the vehicle component condition data and the historical vehicle component condition data may be performed in order to determine if an inconsistency exists between the vehicle component condition data and the historical vehicle component condition data based on the comparison. Upon determining the inconsistency, an alert signal signifying an unauthorized use may be generated. At least one of the vehicle component condition data and the alert signal may be transmitted to a remote terminal to alert a user of the unauthorized use.

21 Claims, 5 Drawing Sheets

(56) References Cited

U.S. PATENT DOCUMENTS

| | | | |
|---|---|---|---|
| 6,339,736 B1 | 1/2002 | Moskowitz et al. |
| 6,343,220 B1 | 1/2002 | Van Der Salm |
| 6,370,472 B1 | 4/2002 | Fosseen |
| 6,415,210 B2 | 7/2002 | Hozuka et al. |
| 6,429,773 B1 | 8/2002 | Schuyler |
| 6,435,018 B1 | 8/2002 | Murakami et al. |
| 6,441,732 B1 | 8/2002 | Laitsaari et al. |
| 6,470,732 B1 | 10/2002 | Breton |
| 6,487,478 B1 | 11/2002 | Azzaro et al. |
| 6,525,643 B1 | 2/2003 | Okada et al. |
| 6,571,617 B2 | 6/2003 | Van Niekerk et al. |
| 6,587,040 B2 | 7/2003 | Seto |
| 6,611,740 B2 | 8/2003 | Lowrey et al. |
| 6,612,165 B2 | 9/2003 | Juzswik et al. |
| 6,629,031 B2 | 9/2003 | Gustavsson et al. |
| 6,671,609 B2 | 12/2003 | Nantz et al. |
| 6,691,025 B2 | 2/2004 | Reimer |
| 6,732,031 B1 * | 5/2004 | Lightner et al. ............ 701/31.4 |
| 6,738,697 B2 | 5/2004 | Breed |
| 6,825,758 B1 | 11/2004 | Laitsaari |
| 6,836,708 B2 | 12/2004 | Tripathi |
| 6,839,614 B1 | 1/2005 | Timko et al. |
| 6,845,314 B2 | 1/2005 | Fosseen |
| 6,847,872 B2 | 1/2005 | Bodin et al. |
| 6,853,853 B1 | 2/2005 | Van Wiemeersch et al. |
| 6,868,358 B2 | 3/2005 | Brown |
| 6,892,052 B2 | 5/2005 | Kotola et al. |
| 6,930,614 B2 * | 8/2005 | Rackham et al. ......... 340/686.1 |
| 6,937,141 B2 | 8/2005 | Muramatsu |
| 6,983,200 B2 | 1/2006 | Bodin et al. |
| 6,993,421 B2 | 1/2006 | Pillar et al. |
| 7,053,761 B2 | 5/2006 | Schofield et al. |
| 7,068,158 B2 | 6/2006 | Komatsu et al. |
| 7,092,804 B2 | 8/2006 | McQuade et al. |
| 7,096,101 B2 | 8/2006 | Sonnenrein et al. |
| 7,114,379 B2 | 10/2006 | Emord |
| 7,170,400 B2 | 1/2007 | Cowelchuk et al. |
| 7,171,188 B1 | 1/2007 | Watanabe et al. |
| 7,216,532 B2 | 5/2007 | Rimkus et al. |
| 7,218,209 B2 * | 5/2007 | Utter et al. .................... 340/442 |
| 7,219,063 B2 | 5/2007 | Schalk et al. |
| 7,224,262 B2 | 5/2007 | Simon et al. |
| 7,228,122 B2 | 6/2007 | Oyagi et al. |
| 7,319,378 B1 | 1/2008 | Thompson et al. |
| 7,379,541 B2 | 5/2008 | Iggulden et al. |
| 7,394,352 B2 * | 7/2008 | Bell et al. ................... 340/426.3 |
| 7,509,849 B2 | 3/2009 | Rutherford et al. |
| 7,778,186 B2 | 8/2010 | Oman et al. |
| 7,783,246 B2 * | 8/2010 | Twitchell et al. ................. 455/1 |
| 7,849,149 B2 | 12/2010 | Habaguchi et al. |
| 7,859,392 B2 | 12/2010 | McClellan et al. |
| 8,061,879 B2 | 11/2011 | Simmons et al. |
| 8,089,348 B2 | 1/2012 | Kameyama |
| 8,120,475 B2 | 2/2012 | Iwamoto et al. |
| 8,325,028 B2 | 12/2012 | Schofield et al. |
| 2001/0033225 A1 | 10/2001 | Razavi et al. |
| 2002/0130771 A1 | 9/2002 | Osborne et al. |
| 2003/0004741 A1 * | 1/2003 | Johnson et al. ................... 705/1 |
| 2003/0016130 A1 | 1/2003 | Joao |
| 2003/0093218 A1 | 5/2003 | Jones |
| 2003/0158640 A1 | 8/2003 | Pillar et al. |
| 2003/0205081 A1 | 11/2003 | Proschka |
| 2003/0208309 A1 * | 11/2003 | Triphathi ....................... 701/29 |
| 2004/0050188 A1 | 3/2004 | Richards et al. |
| 2004/0075539 A1 * | 4/2004 | Savoie et al. ............. 340/426.1 |
| 2004/0112124 A1 | 6/2004 | Sonnenrein et al. |
| 2004/0193368 A1 | 9/2004 | Sanqunetti |
| 2004/0203634 A1 | 10/2004 | Wang et al. |
| 2005/0024189 A1 | 2/2005 | Weber |
| 2005/0137763 A1 | 6/2005 | Watkins et al. |
| 2005/0179518 A1 | 8/2005 | Kawamura et al. |
| 2005/0190900 A1 | 9/2005 | White et al. |
| 2005/0195106 A1 | 9/2005 | Davis et al. |
| 2005/0273218 A1 | 12/2005 | Breed et al. |
| 2006/0095174 A1 | 5/2006 | Sonnenrein et al. |
| 2006/0208865 A1 | 9/2006 | Quach et al. |
| 2006/0220806 A1 | 10/2006 | Nguyen |
| 2006/0220809 A1 | 10/2006 | Stigall et al. |
| 2006/0220813 A1 | 10/2006 | Utter et al. |
| 2006/0235652 A1 | 10/2006 | Rimkus et al. |
| 2006/0273885 A1 | 12/2006 | Thompson |
| 2006/0288101 A1 | 12/2006 | Mastrodonato et al. |
| 2007/0015548 A1 | 1/2007 | Flick |
| 2007/0060056 A1 * | 3/2007 | Whitaker et al. ............ 455/41.2 |
| 2007/0155300 A1 | 7/2007 | Hsieh |
| 2007/0156317 A1 | 7/2007 | Breed |
| 2007/0193348 A1 | 8/2007 | Rutherford et al. |
| 2007/0200671 A1 | 8/2007 | Kelley et al. |
| 2007/0229350 A1 | 10/2007 | Scalisi et al. |
| 2007/0290881 A1 | 12/2007 | Nikitin et al. |
| 2008/0046149 A1 | 2/2008 | Breed |
| 2008/0077292 A1 | 3/2008 | Gisler |
| 2008/0082221 A1 | 4/2008 | Nagy |
| 2008/0106859 A1 | 5/2008 | Eguchi et al. |
| 2008/0125665 A1 | 5/2008 | Nigam |
| 2008/0136611 A1 * | 6/2008 | Benco et al. ................. 340/426.3 |
| 2008/0140265 A1 | 6/2008 | Hong et al. |
| 2008/0147265 A1 | 6/2008 | Breed |
| 2008/0147271 A1 | 6/2008 | Breed |
| 2008/0172147 A1 | 7/2008 | Taki et al. |
| 2008/0197970 A1 | 8/2008 | Fouts |
| 2008/0204556 A1 | 8/2008 | de Miranda et al. |
| 2008/0215665 A1 | 9/2008 | Appleby et al. |
| 2008/0228355 A1 | 9/2008 | De Jonk et al. |
| 2008/0266051 A1 | 10/2008 | Taki et al. |
| 2008/0299961 A1 | 12/2008 | Muller et al. |
| 2008/0309451 A1 | 12/2008 | Zellweger et al. |
| 2009/0075624 A1 * | 3/2009 | Cox et al. ...................... 455/345 |
| 2009/0091437 A1 | 4/2009 | Corniot |
| 2009/0096575 A1 | 4/2009 | Tieman |
| 2009/0096576 A1 | 4/2009 | Oman et al. |
| 2009/0096596 A1 | 4/2009 | Sultan et al. |
| 2009/0098907 A1 | 4/2009 | Huntzicker et al. |
| 2009/0167524 A1 | 7/2009 | Chesnutt et al. |
| 2009/0273438 A1 * | 11/2009 | Sultan et al. ..................... 340/5.7 |
| 2010/0145759 A1 * | 6/2010 | Hembury .......................... 705/9 |
| 2010/0168967 A1 | 7/2010 | Dlugoss et al. |
| 2010/0233957 A1 | 9/2010 | Dobosz |
| 2011/0015971 A1 * | 1/2011 | Hembury ........................ 705/13 |
| 2011/0071720 A1 | 3/2011 | Schondorf et al. |
| 2011/0071725 A1 | 3/2011 | Kleve et al. |
| 2011/0071734 A1 | 3/2011 | Van Wiemeersch et al. |
| 2011/0080282 A1 | 4/2011 | Kleve et al. |
| 2011/0130945 A1 * | 6/2011 | Deedy et al. .................. 701/112 |

OTHER PUBLICATIONS

Check Tire Pressure with Bluetooth, printed from www.esato.com, Jul. 30, 2004.
Acumine Pty Ltd—Fleet Monitoring System, http://www.acumine.com/_Products/Fleet Monitoring.php., May 22, 2009.
Vehicle monitoring system, GPS vehicle monitoring system. Vehicle tracking system. http://www.guardmagic.com/, May 22, 2009.
Printout from www.solindoweb.com/products.php on Sep. 16, 2009.
Chinese Office Action, FMC 2913 PUS1 Family, Dated Mar. 4, 2013.
German Office Action, FMC 2913 PUS1 Family, Dated Mar. 1, 2013.

* cited by examiner

METHOD AND SYSTEMS FOR DETECTING AN UNAUTHORIZED USE OF A VEHICLE BY AN AUTHORIZED DRIVER

BACKGROUND

1. Technical Field

Various embodiments include a method and system for detecting an unauthorized use of a vehicle. The unauthorized use may be by an authorized driver.

2. Background Art

Authorized drivers of a vehicle (i.e., drivers other than the vehicle owner such as (without limitation children and employees) may use a vehicle for purposes other than the vehicle's intended purpose. For example, employees may use a company vehicle for personal needs while driving to a job site. As another example, children may take a detour with the vehicle to venues other than those known and approved by a parent. While vehicle tracking systems exist for tracking an unauthorized use, existing tracking system are generally used for vehicle anti-theft deterrence. These tracking systems may use tracking technologies such as radio frequency (RF) transmitter beacons, Global Positioning Systems (GPS) transceivers for reporting GPS location, or embedded cell phone transceivers that are triangulated. These tracking devices are generally placed in a vehicle in a location that makes it difficult for a thief to detect and locate the tracking box. Even with these approaches, automotive thieves have developed clever ways of detecting and defeating these approaches so that a stolen vehicle cannot be tracked by authorities because thieves do not want to draw attention and also want to maximize the fencing value of the stolen vehicle, most of the defeat techniques used by thieves are non-destructive.

Recently, vehicle owners have been using similar devices in order to track the location of vehicles driven by authorized user (e.g., company employees, customers, and/or children). Such tracking is generally a condition of use of the vehicle. These tracking systems may transmit information from a vehicle to the owner or monitoring system to alert the owner that the vehicle has been moved, is moving, or has exceeded some geographical boundary or other data point. Such information may allow the owner to determine whether the usage of the vehicle is acceptable and authorized by the owner. It is known that a segment of these authorized drivers object to and may not like the fact that they are being tracked but agree to such terms as a condition of employment or parental approval for use of the vehicle. Such an objection to the tracking may cause a motivation to disable the system. Some individuals may act on this motivation if it is known that such a system may be easily defeated, difficult to trace, and/or provide financial and/or privacy incentives. Examples of a financial incentive may include the avoidance of rental car company penalties for driving out of state, speeding, and off-road usage. One example of a privacy incentive may include a teen driver notifying his/her parent that he/she will be at a friend's house for the evening when the teen intends to be at a party across town.

Because conventional commercial tracking systems may not be concerned with tracking thieves, they may not consider concealing the tracking system hardware and/or wiring within the vehicle. In addition, the installation of such systems in the vehicle may be in the same general location and instruction manuals may be readily available on the internet or from the original equipment manufacturer (OEM), which provides information as to the location of the device in the vehicle.

Conventional tracking systems may draw a larger key-off load (KOL) that can tax the battery of the vehicle. Such a larger KOL may cause no-start conditions or give rise to premature wear-out of the vehicle battery. In one example, a KOL target for a GPS tracking system may be 3 to 5 mA. Because the KOL may be large, aftermarket products and OEMs may disable GPS operation when the vehicle is shut-off to reduce operating current and associated service costs. In this case, a call center or tracking provider may report the last known powered location when an owner of the vehicle makes an inquiry on the location of the vehicle. This situation can be simulated when driving by removing power to the tracking system to cause the vehicle to look stationary.

Using their gained knowledge on how to disable a tracking system, authorized drivers may accordingly simulate a vehicle shutdown. Consequently, a call center or tracking provider may report the last known powered location when an inquiry is made by an owner of the vehicle's location. Such a simulation may appear "normal" to a call center or tracking provider because many aftermarket producers and OEMs may turn off the GPS system when the vehicle is shut-off in order to reduce operating current associated with a substantial key-off load (KOL) current drawn by these tracking systems and associated service cost. The KOL current may tax the battery of the vehicle which may cause vehicles not to start or a vehicle battery to prematurely wear out.

Other aftermarket providers that are less concerned with KOL may use strategies to wakeup and transmit GPS data at set intervals (e.g., an hourly location report that is collected every twelve minutes). However, the periodic update approval may not prevent a determined authorized user from temporarily jamming the GPS system during a period of unauthorized use.

SUMMARY

One aspect includes a tracking system for detecting an unauthorized use of a vehicle in the absence of GPS location information. The system may include at least one data processor which may be configured to receive vehicle component condition data for one or more vehicle components. The at least one data processor may also be configured to receive historical vehicle component condition data for the one or more vehicle components.

The at least one data processor may be configured to compare the vehicle component condition data to the historical vehicle component condition data. Accordingly, it may determined if an inconsistency exists between the vehicle component condition data and the historical vehicle component condition data based on the comparison. An alert signal signifying an unauthorized use may be generated upon determining the inconsistency. The at least one data processor may be configured to transmit at least one of the alert signal and the vehicle component condition data to a remote terminal to alert a user of the unauthorized use.

Another aspect may include a method for detecting an unauthorized use of a vehicle in the absence of GPS location information. The method may include receiving vehicle component condition data for one or more vehicle components and receiving historical vehicle component condition data for the one or more vehicle components.

The method may further include comparing the vehicle component condition data to the historical vehicle component condition data. The method may also include determining if an inconsistency exists between the vehicle component condition data and the historical vehicle component condition data based on the comparison.

Upon determining the inconsistency, an alert signal signifying an unauthorized use may be generated. At least one of the alert signal and the vehicle component condition data may be transmitted to a remote terminal to alert a user of the unauthorized use.

Another aspect may include a method which includes receiving a signal defining a key on event, vehicle component condition data responsive to the key on event, and vehicle component condition data determined at a key off event. The method may also include comparing the key on event data to the key off event data. The method may additionally include identifying an inconsistency in the data based on the comparison. An unauthorized use alert signal based on the inconsistency may be generated. At least one of the alert signal and the vehicle component condition data may be transmitted to a remote terminal.

These and other aspects of the present invention will be better understood in view of the attached drawings and following detailed description of the invention.

BRIEF DESCRIPTION OF THE DRAWINGS

The figures identified below are illustrative of some embodiments of the present invention. The figures are not intended to be limiting of the invention recited in the appended claims. Embodiments of the present invention, both as to their organization and manner of operation, together with further object and advantages thereof, may best be understood with reference to the following description, taken in connection with the accompanying drawings, in which:

DETAILED DESCRIPTION

Detailed embodiments of the present invention are disclosed herein. However, it is to be understood that the disclosed embodiments are merely exemplary of an invention that may be embodied in various and alternative forms. Therefore, specific functional details disclosed herein are not to be interpreted as limiting, but merely as a representative basis for the claims and/or as a representative basis for teaching one skilled in the art to variously employ the present invention.

When an authorized user temporarily disables a tracking system, the authorized user can engage in unauthorized movement or use of the vehicle undetected. For example, by disabling the vehicle's tracking system, it may appear to a vehicle monitoring system (e.g., a call center or tracking provider) that the vehicle has not moved (e.g., from it last recorded location). However, the authorized user may have in fact detoured to unauthorized locations during the period that the tracking system was disabled and returned the vehicle back to its pick-up location.

It may be possible to detect an unauthorized use by an authorized user by programming the tracking system to send a heartbeat signal to the powertrain control module (PCM). If the tracking module is not fully active, the heartbeat would be absent and the PCM would not allow the engine to run or would limit speed (or some other engine parameters) until the tracking module became functional. However, such detection methods may create intrusive failure modes and unpredictable operation because the system requires that both the tracking module and the PCM be functional for the vehicle to drive. Furthermore, distinguishing between intentional blockage of GPS signals and normal loss (e.g., in a garage or tunnel) may be difficult. As such, drivers may be left stranded unable to restart or drive the vehicle away.

It is contemplated that the embodiments described herein may be utilized for purposes other than those described and that challenges or problems noted herein are not intended to be an exhaustive list of problems that may be overcome by the embodiments of the present invention. Such challenges or problems as described herein are noted for illustrative purposes and that all of the challenges or problems that may be overcome by the various embodiments of the present invention are not described for purposes of brevity. Moreover, it is contemplated that the embodiments described herein may provide for a number of advantages (or benefits) and that those noted herein are not intended to be an exhaustive list that may be achieved. Such advantages disclosed herein are noted for illustrative purposes and that all of the advantages achieved by the embodiments of the present invention are not described herein for purposes of brevity as well. Furthermore, the examples provided herein are disclosed for illustrative purposes and are not intended to limit the scope in any manner.

Figure 1:
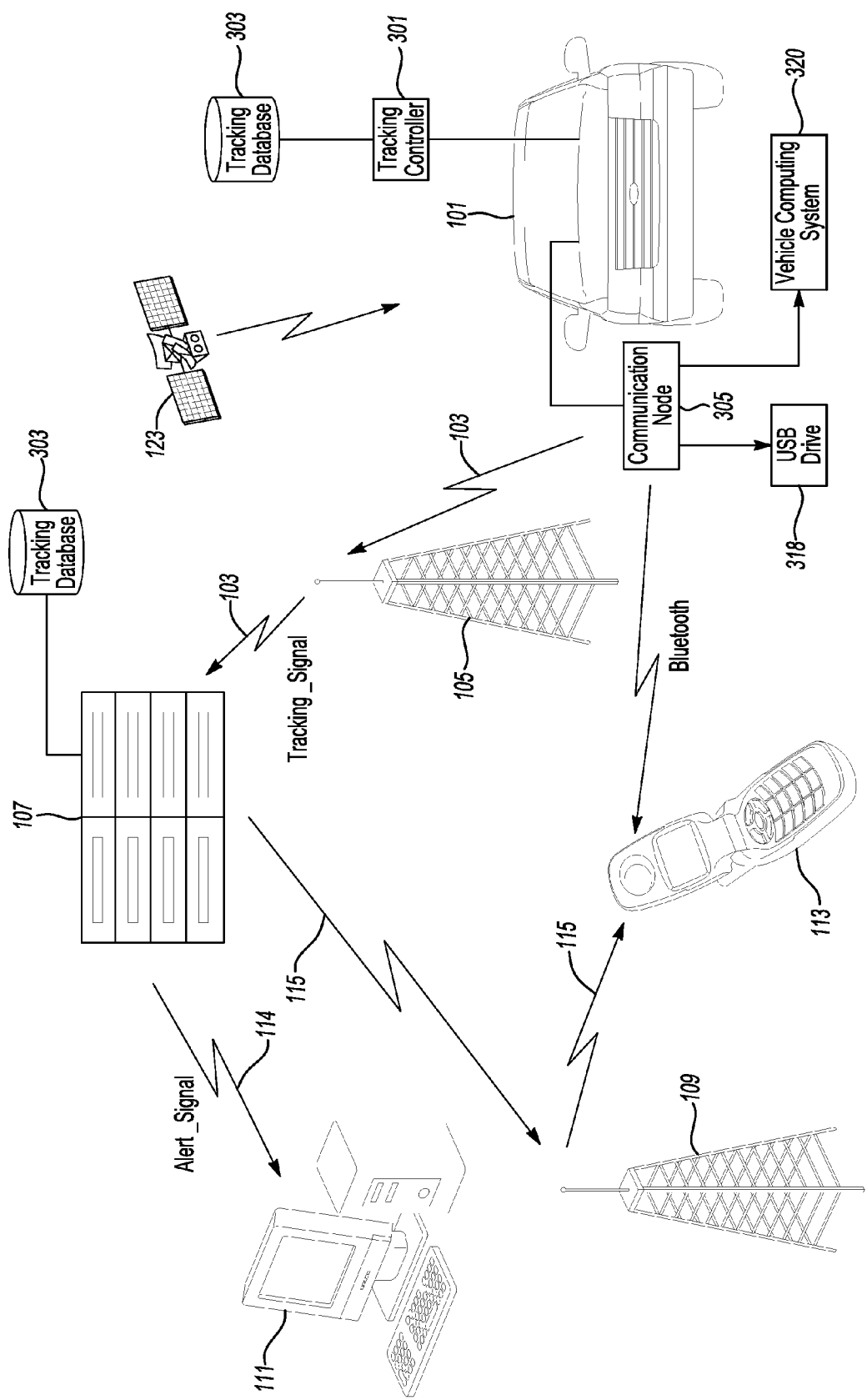
FIG. 1 shows one embodiment of the architecture of a system for determining an unauthorized use of a vehicle according to the various embodiments.

FIG. 1 shows a tracking system architecture for detecting an unauthorized use of one or more vehicles according to one of the various embodiments of the present invention. An unauthorized use may be made by an authorized user. Authorized users may include, but are not limited to, company employees, independent contractors, and other individuals given permission to drive a vehicle from vehicle owners (e.g., teenage children). For example, a 17 year old child may be given permission from a parent to drive the parent's vehicle to location A. If the vehicle is also driven to location B by the child, the parent may receive an alert signal and/or report of this unauthorized use to a nomadic device, personal computer, or a vehicle computing system based on one or more vehicle conditions determined by the vehicle 101. The parent may also upload the report to a USB drive.

In the non-limiting embodiment described with respect to FIG. 1, a tracking signal 103 may be transmitted from one or more vehicles 101 through a communication (e.g, cellular) network 105. It will be appreciated that vehicle 101 may be one or more vehicles. The vehicle 101 may have installed a communication module or node 200 (described below with respect to FIGS. 2a-2d) for communicating data over communication network 105. Vehicle 101 may also have installed a tracking controller 301 (described below with respect to FIG. 3). It should be understood that tracking signal 103 is not a GPS tracking signal. Rather, tracking signal 103 is a signal having vehicle component condition data for tracking the unauthorized use of a vehicle as described in further detail below.

The tracking signal 103 may be transmitted at a key-on event. In one non-limiting embodiment, transmission of the tracking signal 103 may additionally or alternatively be based on a triggering event such as an inconsistency (i.e., interruption) in the transmission of wireless data (e.g., and without limitation, cellular, WiFi, or GPS). Thus, a time gap in wireless data transmission may trigger transmission of the tracking signal 103.

A use of a vehicle may go undetected in various ways. In one non-limiting example, the authorized user may deactivate or disengage the GPS tracking system to prevent reception of GPS signals. In another non-limiting example, the authorized user may remove the electrical power connection or fuse for the GPS receiver module, the RF/satellite transmitter module, the cellular module, a WiFi module, or the motion sensing module. In yet another non-limiting example, the authorized user may unplug the GPS, cellular, or WiFi antenna cable and cap the RF connector or wrap the module in foil (known as shielding). As yet another non-limiting example, the authorized user may use a noise generator that jams wireless frequencies (e.g., and without limitation, WiFi, cellular, and GPS).

At the key-on event, tracking controller 301, which may be in communication with a number of vehicle components, may receive a condition or state of the number of vehicle components via a vehicle network (e.g., a CAN bus). Upon receiving the vehicle component condition information, the tracking signal 103, including the vehicle component condition information, may be generated by the tracking controller 301 and transmitted via the communication node 200. At the key-off event, the condition of the vehicle components may be recorded and stored in database 303.

Figure 3:
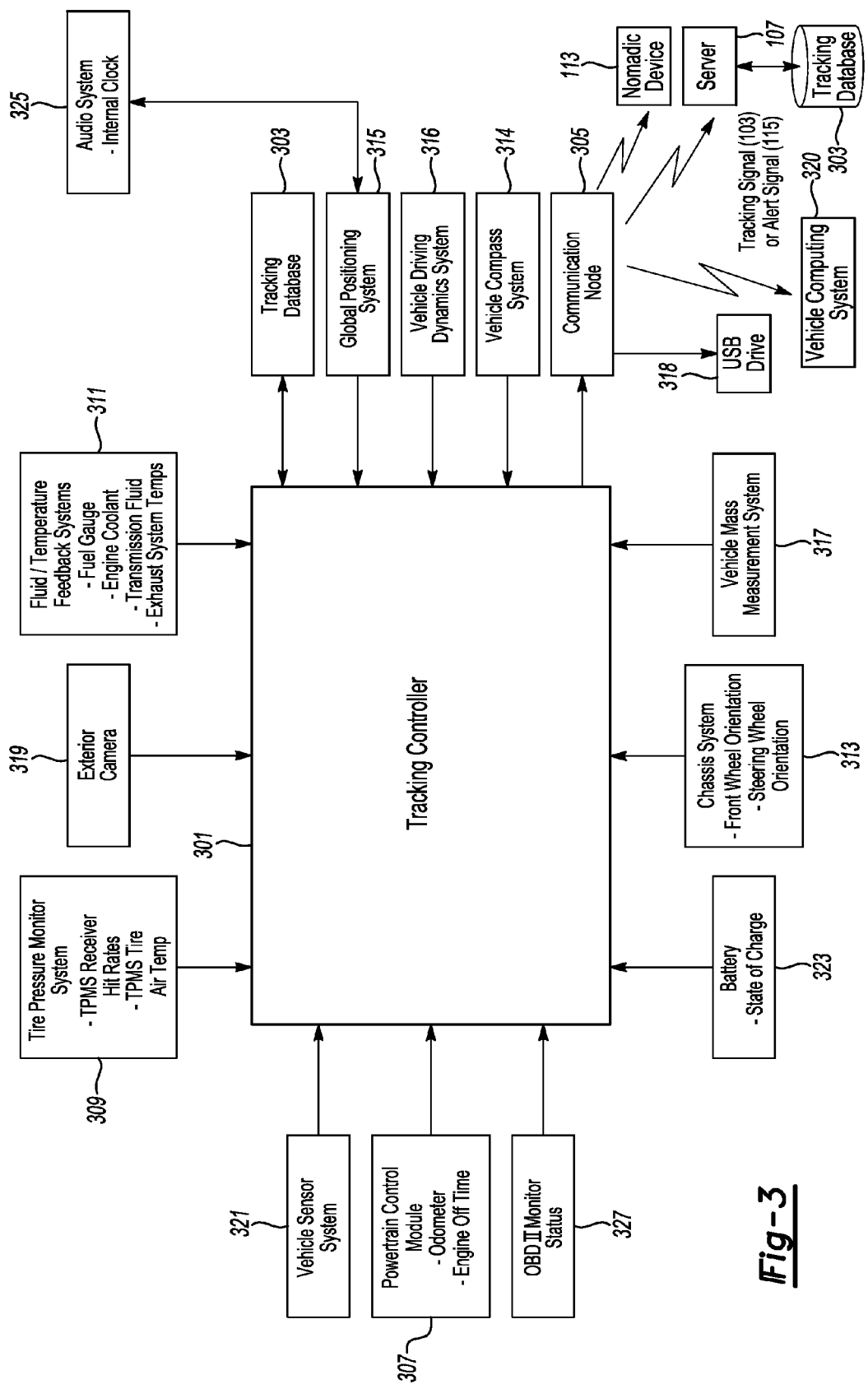
FIG. 3 shows an illustrative example of a tracking module in a vehicle for detecting an unauthorized use of the vehicle according to the various embodiments.

A centralized system 107 may receive data transmitted via tracking signal 103 from vehicle 101 and compare the data with data in a tracking database 303 (FIG. 3). In one embodiment, the centralized system 107 is a server system that includes processing capability for the incoming tracking signals 103 and the capability to output alert signal(s) 115 to a nomadic device 113. For example, the server(s) 107 may include an automated call server and/or web host. Data sent in this fashion may be sent using data-over-voice, a data-plan, or in any other suitable format.

Data can also be sent from the remote vehicle 101 through the server(s) 107 to a personal computer 111. In this case, the data is likely, although not necessarily, sent over the internet.

Tracking database 303 may or may not be accessed via server 107. For example, as illustrated in one embodiment in FIG. 3, tracking database 303 may additionally or alternatively be maintained locally (e.g., at the vehicle 101) and communicating with tracking controller 301. Thus, in this embodiment, data transmitted in tracking signal 103 to server 107 may include one or more results from a lookup or comparison performed at the vehicle 101 with database 303. Alternatively, tracking signal 103 may be alert signal 114 and/or 115 transmitted directly to PC 111 and/or ND 113 from the vehicle 101.

In yet another embodiment, a tracking signal/alert signal may be transmitted to a portable memory device (e.g., and without limitation) USB drive 318, an on-board vehicle computing system (VCS) 320, and/or nomadic device 113 via a BLUETOOTH connection. A user may then receive the alert signal(s) from the USB drive 318 (e.g., and without limitation, by plugging the USB drive into PC 111 and/or vehicle computing system 320), the vehicle computing system 320 or the nomadic device 113. In one embodiment, in order to receive the alert(s), the comparison data from tracking database 303 in the vehicle 101 may also be transmitted via the communication node 305 for retrieval by a user (e.g., a parent or fleet manager) from one or more of USB drive 318, VCS 320 and/or nomadic device 113. In another embodiment, the vehicle condition data may be transmitted to the USB 318, the VCS 320 and/or the nomadic device 113. In some embodiments, the vehicle component condition data may also include information useful for the user (e.g., the parent and/or fleet manager) such as why the unauthorized use was undetected. Some non-limiting ways in which an unauthorized use may go undetected are described above.

Alternatively or additionally, where the database 303 is implemented at server 107, data transmitted in tracking signal 103 may include status or condition information gathered from one or more vehicle components by the tracking controller 301. The data may then be compared with the tracking data in database 303 at server 107.

Tracking data in database 303 may be historical status or condition data for the one or more vehicle components. Current (e.g., the most recent) vehicle component condition information may be compared with the historical data to detect an unauthorized use of the vehicle. Historical data may include measured values of the one or more vehicle components based on the a key-off event. In some embodiments, the measured historical values may be estimated values. In other embodiment, the measured values may be actual values. For example, and without limitation, a current vehicle temperature may be compared with an estimated or actual vehicle temperature at a key-off event. Other measured values may include, but are not limited to, odometer reading values, engine temperatures, tire pressure monitor system (TPMS) rates, etc.

As a non-limiting example, if at the last key-off event the engine temperature reading is 50° F. (as stored in database 303) and, at the key-on event, the engine temperature reading is 220° F., an unauthorized use may be detected, and an alert transmitted to the PC 111 and/or ND 113, based on the temperature discrepancy. The discrepancy may be determined by the comparison of the vehicle component information at key-on (transmitted by tracking signal 103) and the historical data in database 303. Based on this discrepancy, a monitoring agent (described below) may conclude that the user may have disabled the GPS tracking system and made an unauthorized use of the vehicle. The comparison process will be described below in further detail with respect to FIG. 4.

Once the server(s) 107 receive the incoming data from the vehicle 101, alert signal(s) 114 and/or 115 may be generated and transmitted to PC 111 and/or ND 113. Alternatively, as described above, the alert signal(s) 114, 115 may be generated at and transmitted from vehicle 101. The alert signal(s) 114, 115 may indicate an unauthorized or unreported use of the vehicle 101. The signals(s) may be transmitted to PC 111 and/or ND 113 through a communication network 109 (e.g., cellular, WiFi, WiMax, etc.). Non-limiting examples of alerts that may be received at PC 111 and/or ND 113 may include an audible alert (e.g., and without limitation, a beep, an alarm, a cellphone ring, etc.) and/or a visual alert (e.g., and without limitation, a text message, an electronic mail message, etc).

A monitoring agent may determine whether the unauthorized use is an actual unauthorized use. A monitoring agent may be either a human agent (e.g, a parent or a fleet manager) or software installed on server 107, PC 111 and/or ND 113. Since there may be reasonable explanations for the discrepancy in data, a further assessment may be made by the monitoring agent whether the discrepancy is indicative of an unauthorized use. Where the monitoring agent is software, an algorithm may be programmed to the software for making the assessment. For example, the algorithm may make a determination based on a balancing of the data associated with multiple vehicle conditions. Alternatively or additionally, the monitoring agent may identify an unauthorized use based on a threshold number of discrepancies. For instance, if a discrepancy exists in more than a certain number of vehicle conditions (e.g., 3, 5, or 7), then the monitoring agent will identify the use as unauthorized. Where the monitoring agent is a human agent, a manual assessment can also be made using the alerts presented to the agent at PC 111 and/or ND 113.

FIGS. 2a-d show illustrative examples of vehicle-based communication nodes or modules 305 that provide communication to a remote network.

Figure 2A:
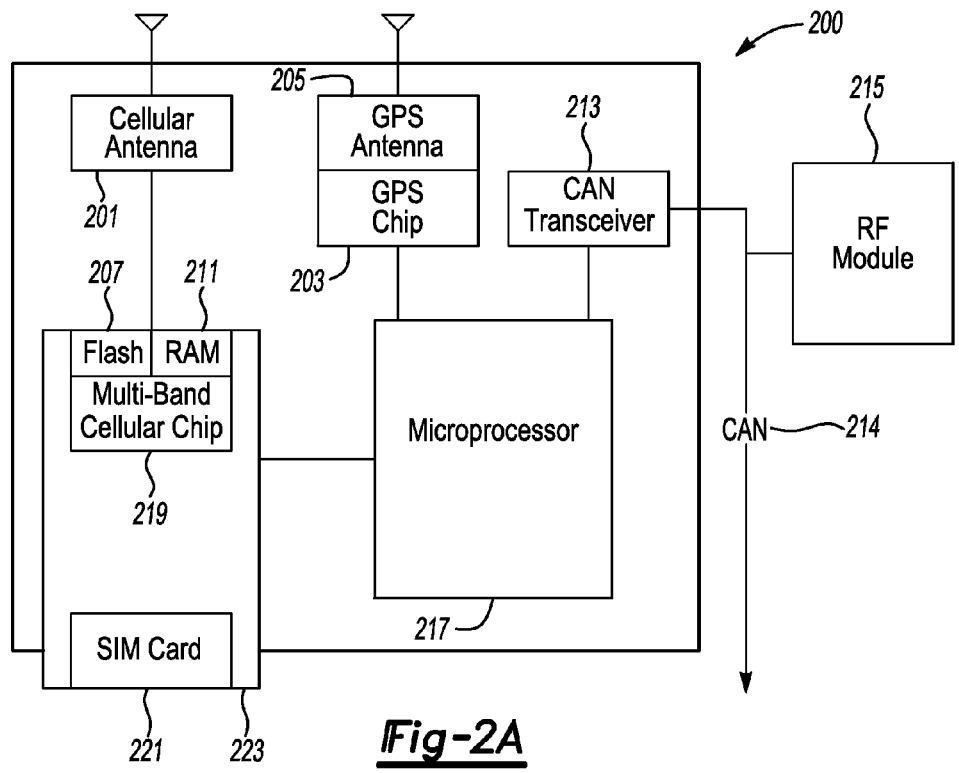
FIGS. 2a-d show illustrative examples of vehicle-based communication modules that provide communication to a remote network.

FIG. 2a shows an illustrative example of a communication module combined with a GPS module, wherein a GSM and GPS are on different boards.

In this illustrative embodiment, a communications module can include a GSM antenna 201 that communicates with a remote server over a cellular network. The received cellular signal may be sent from the GSM Antenna 201 to a multi-band GSM decoder 219, that processes the received signal to produce information usable by the microprocessor 217.

In this illustrative embodiment, the multi-band GSM 219, including flash memory 207 and RAM 211, is installed in the module as part of a removable device 223 including a SIM card 221. The SIM card may contain user identifying information that allows access to the cellular network under a particular user's plan.

Additionally, the module includes a GPS chip 203 that can process and decode a signal from the GPS antenna 205 and send this information to a microprocessor 217.

The microprocessor is also in communication with a vehicle data bus that provides access to various vehicle modules, such as a radio frequency module 215. Other modules not shown include, but are not limited to, the vehicle cluster, a remote (off-board) GPS system, a radio module, etc. Non-limiting examples of a vehicle data bus include an SAE J1850 bus, a CAN bus, a GMLAN bus, and any other vehicle data buses known in the art. For illustration purposes only, FIGS. 2a-2d are represented as using a CAN bus.

Figure 2B:
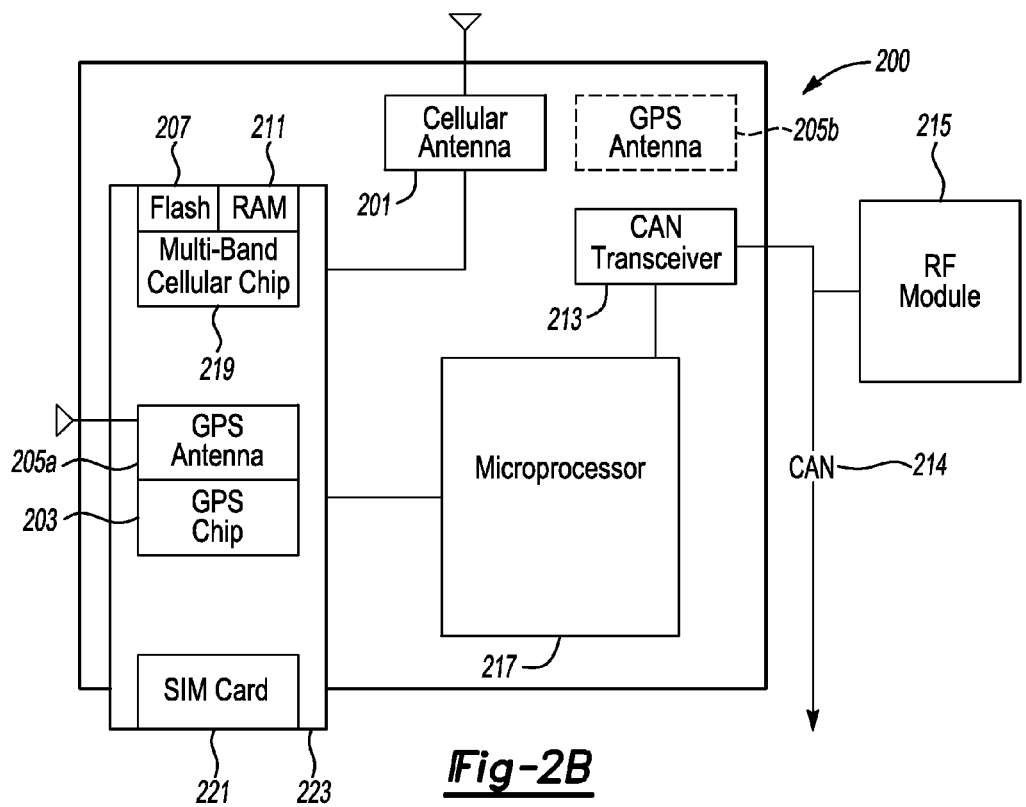

FIG. 2b shows a second exemplary embodiment in which a GSM and GPS are on the same board 223. In this illustrative embodiment, the removable board (this board may also be permanently attached to the module) 223 contains the SIM card 221, a GPS module including a GPS chip 203 and a GPS antenna 205a, and the Multi-band GSM 219 including flash memory 207 and RAM 211.

In another embodiment, the GPS antenna 205b may be attached to the module separately from this board 223. When a signal comes in from the GSM antenna and/or the GPS Antenna 205b, the signal may be sent to the corresponding GSM/GPS chip for processing, and then passed to the microprocessor 217. The microprocessor interfaces with the CAN transceiver 213 to connect to a vehicle CAN network and vehicle modules such as a radio frequency module 215.

Figure 2C:
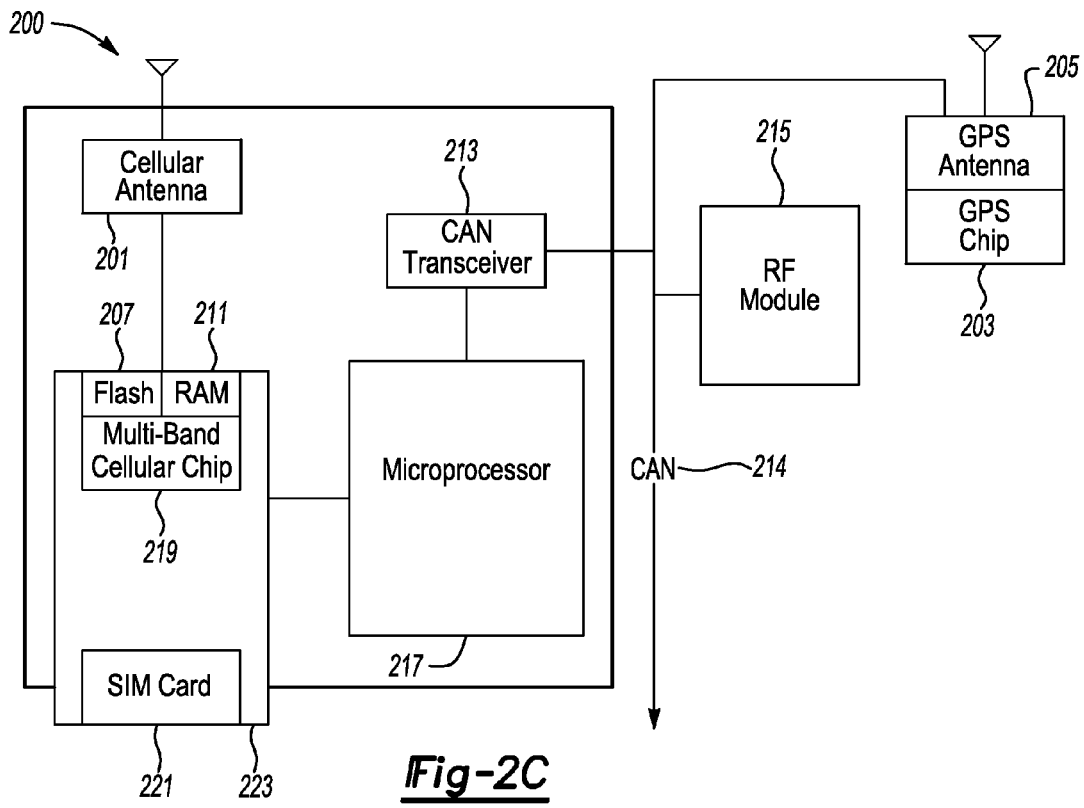

FIG. 2c shows yet another exemplary embodiment in which the GSM module is standalone. In this illustrative embodiment, the GPS module containing the GPS antenna 205 and the GPS chip 203 connects to the microprocessor 217 through the CAN transceiver 213. Other vehicle modules, such as an RF module 215 can also connect to the microprocessor through the CAN transceiver.

In this illustrative embodiment, the removable board 223 contains a SIM card 221 and a multi-band GSM 219, as well as a flash memory 207 and RAM 211. Signals from the GSM antenna 201 are sent to the board 223 for processing by the multi-band GSM before being sent to the microprocessor 217.

Figure 2D:
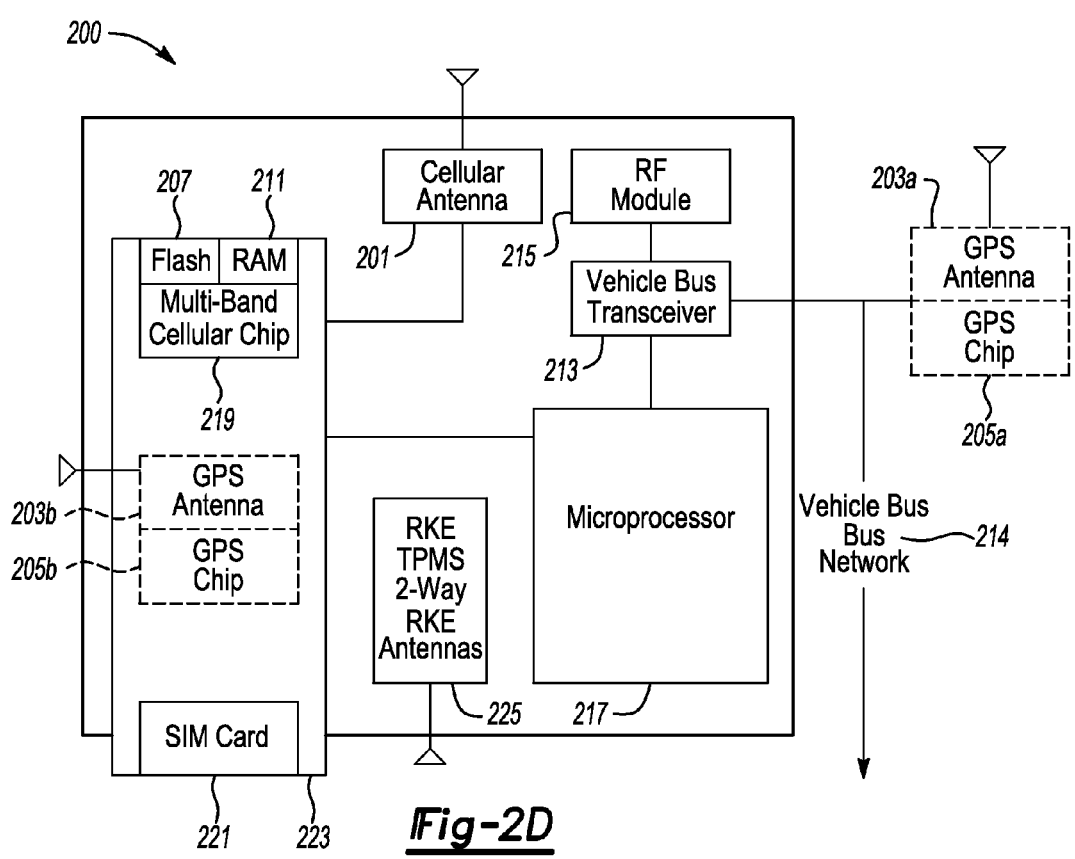

FIG. 2d shows still another exemplary embodiment in which a GSM module is combined with an RF transceiver 215 in the communications module. The RF transceiver continues to talk to the microprocessor 217 through the CAN transceiver 213. In this illustrative embodiment, the GPS module, including the GPS antenna 203a, 203b and GPS chip 205a, 205b can be located within the communications module or located elsewhere in the vehicle, in which case it may communicate with the microprocessor through the CAN transceiver.

Again, in this embodiment, the GSM antenna 201 sends a signal to the multi-band GSM 219, including flash memory 207 and RAM 211. The signal is processed and sent to the microprocessor. The multi band GSM is again located on a removable circuit board 223, which also includes a SIM card 221.

FIG. 3 shows a tracking system 10 for detecting an unauthorized use of a vehicle according to one of the various embodiments of the present invention. As described above, a tracking controller 301 and a communication module or node 305 may be installed in the vehicle 101. Furthermore, tracking database 303 may be maintained locally (e.g., at the vehicle), as illustrated in FIG. 3, and/or implemented in server(s) 107.

The tracking controller 301 may receive condition/status information from a number of vehicle components. Upon obtaining information from one or more vehicle components, the data may be transmitted as a tracking signal 103 and/or an alert signal 115 as described above.

The following table describes each of these vehicle components and the condition information that it transmits to the tracking controller 301.

TABLE (FIG. 3)

| Vehicle Component | Reference Number | Condition Information |
|---|---|---|
| Powertrain Control Module | 307 | Odometer Readings/Mileage Status |
| Powertrain Control Module | 307 | Engine Off Time. For example, if the engine off soak time indicates that the engine has not been off as long as the last GPS time stamp (e.g., at key-off), the power may have been removed from the GPS unit and the vehicle started. |
| Tire Pressure Monitoring System (TPMS) | 309 | TPMS Receiver Hit Rates. For example, if the TPMS is transmitting at a high rate, then the wheels were recently in motion. |
| Tire Pressure Monitoring System (TPMS) | 309 | TPMS Tire Air Temperature. For example, if tire air temperature is significantly higher than what would be expected due to ambient and sun load effect, this may indicate that the vehicle was recently driven at a high speed for an extended period. |
| Fluid Level/Component Temperature Feedback System | 311 | Fuel Gauge. For example, the fuel level has reduced significantly since the last received value. |
| Fluid Level/Component Temperature Feedback System | 311 | Engine Coolant Temperature Model. For example, if the temperature of the engine is significantly warmer since the last received value, an unauthorized use may be detected. |
| Fluid Level/Component Temperature Feedback System | 311 | Transmission Fluid Temperature Level/Status (e.g., temperature is significantly warmer since last received value). |

TABLE-continued (FIG. 3)

| Vehicle Component | Reference Number | Condition Information |
|---|---|---|
| Fluid Level/Component Temperature Feedback System | 311 | Exhaust System Temperatures (e.g., temperature is significantly higher than last received value). |
| Chassis System | 313 | Front Wheel or Steering Wheel Orientation. For example, if the orientation is measured after the key is removed (i.e., ignition lock) and after release, a wide angular change in wheel position may indicate the car moved. |
| Vehicle Compass System | 314 | Vehicle Orientation (i.e., compass). For example, the vehicle is within 3-6 meters of the original location (based on GPS capability), but the vehicle is 180° from the original position. |
| Vehicle Driving Dynamics System | 316 | Vehicle Inclination. For example, data from the vehicle anti-theft system or an on-board accelerometer shows a substantially new inclination orientation indicating that the vehicle was moved and not return to the exact position. |
| Vehicle Mass Measurement System | 317 | Cargo or trailer mass. For example, if a fleet owner has a driver check on a site but receives an alert that the vehicle pulled 2 Tons for 30 minutes, the driver may have also dropped off his boat at the local beach launch ramp. |
| Exterior Camera | 319 | Vehicle location/Vehicle Occupant activities. For example, the system could periodically (e.g., every 5 or 10 minutes) record images from external cameras such as the rear or front park aid cameras or the front lane departure warning camera. In one embodiment, the camera can also include a time and date stamp. |
| Vehicle Sensor System | 321 | Sensor History. For example, if there is no signal/heartbeat from the GPS, but the key is on, the vehicle is in motion, the engine is running and/or temperatures are high, the tracking controller 301 may periodically (e.g., every 5 or 10 minutes) record speed, temperatures and transmission gear and/or run/shutoff events. In one embodiment, the information may also include time and date stamps. |
| Battery | 323 | State of Charge. For example, if the battery's charge is significantly higher from the last key-on event, then the vehicle may have been in motion for an extended period of time. |
| Audio System | 325 | Internal Clock. If the vehicle clock is not GPS based, a GPS tracker module 315 (which tracks time based on GPS signals from satellite 123), can periodically query the vehicle clock to determine if there is a discrepancy in time since the last time the tracker module was booted. |
| OBD II Monitor | 325 | OBD II Monitor Status. For example, an unauthorized use may be detected if previously unseen engine diagnostic codes are stored in the PCM memory, the number of start events does not coincide with the last number of valid starts with the GPS system active, and/or if state of some of the monitors that require the engine to be running or vehicle movement have advanced. |

Figure 4:
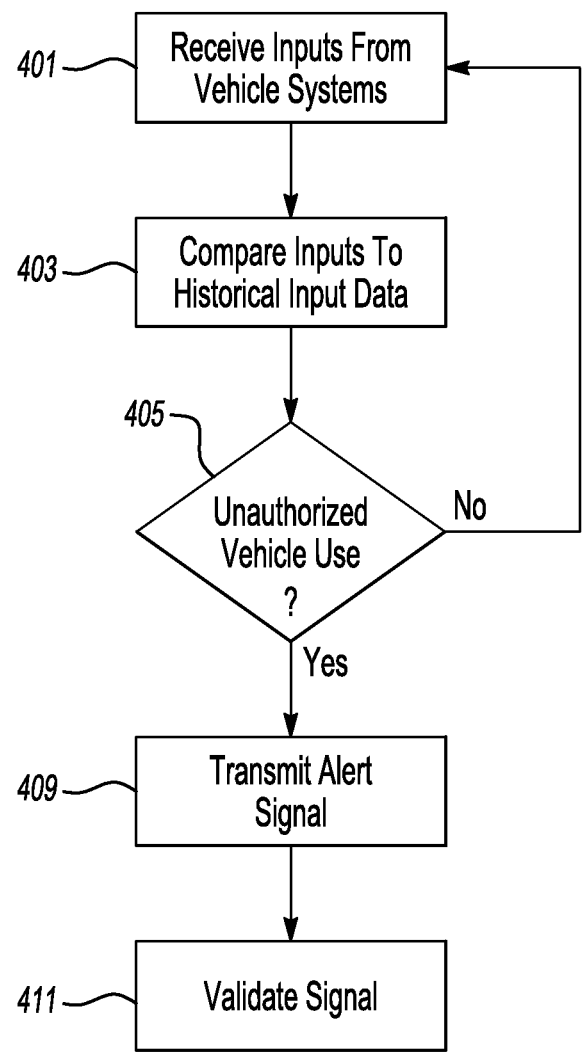
FIG. 4 shows the process for detecting an unauthorized use according to one of the various embodiments.

FIG. 4 shows the operation for detecting an unauthorized use of a vehicle. As illustrated in block 401, inputs (vehicle component condition information) are received at the tracking controller 301 from one or multiple vehicle components. A comparison of the inputs to the historical data in tracking database 303 may be made as illustrated in block 403. The vehicle component condition information may or may not be transmitted to the server 107 for the comparison. The tracking controller 301 or server 107 may include an algorithm or instructions for performing the comparison.

Based on any single condition or logical combination of conditions, a determination may be made as to the existence of an unauthorized use as illustrated in block 405. The logical combination of conditions may or may not be configured by a user. If the use is authorized, the inputs from the vehicle system may continue to be received, as illustrated in block 401. In one embodiment, any further processing may be suspended until new inputs are received (e.g., at a key-off event) by the tracking controller 301.

If an unauthorized use is detected, an alert signal may be transmitted to the PC 111 and/or ND 113 as illustrated in block 409. As illustrated in block 411, the alert signal may then be validated by the monitoring agent.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A tracking system for detecting an unauthorized use of a vehicle in the absence of GPS location information, the system comprising:
at least one data processor operably configured to:
receive vehicle component condition data for one or more vehicle components at key-on;
receive actual or estimated historical vehicle component condition data for the one or more vehicle components having been stored at a previous key-off;
compare the vehicle component condition data to the actual or estimated historical vehicle component condition data;
determine if an inconsistency exists between the vehicle component condition data and the actual or estimated historical vehicle component condition data based on the comparison;

generate an alert signal signifying an unauthorized use upon determining the inconsistency; and transmit at least one of the alert signal and the vehicle component condition data to a remote terminal to alert a user of the unauthorized use.

2. The tracking system of claim 1 wherein the at least one data processor is a server.

3. The tracking system of claim 1 wherein the at least one data processor is disposed in a vehicle computing system.

4. The tracking system of claim 1 wherein the at least one data processor is a server, the system further comprising a vehicle computing system operably configured to:

receive vehicle component condition data from the one or more vehicle components; and transmit a signal including the vehicle component condition data to the server.

5. The tracking system of claim 1 further comprising at least one validating module configured to validate the alert signal with respect to the use being unauthorized.

6. The tracking system of claim 1 wherein the vehicle further includes a GPS tracking system, the alert signal further signifying a tampering of the GPS tracking system.

7. The tracking system of claim 1 further comprising a historical vehicle condition component database for storing the historical vehicle component condition data.

8. The tracking system of claim 1 wherein the remote terminal is a nomadic device.

9. The tracking system of claim 1 wherein the remote terminal is a personal computer or an on-board vehicle computing system.

10. The tracking system of claim 1 wherein the remote terminal is a portable memory device.

11. A method for detecting an unauthorized use of a vehicle in the absence of GPS location information, the method comprising:

receiving vehicle component condition data for one or more vehicle components;

receiving actual or estimated historical vehicle component condition data for the one or more vehicle components at a key-on;

comparing the vehicle component condition data to the actual or estimated historical vehicle component condition data having been stored at a key-off;

determining if an inconsistency exists between the vehicle component condition data and the actual or estimated historical vehicle component condition data based on the comparison;

upon determining the inconsistency, generating an alert signal signifying an unauthorized use; and transmitting at least one of the alert signal and the vehicle component condition data to a remote terminal to alert a user of the unauthorized use.

12. The method of claim 11 further comprising validating the alert signal with respect to the use being unauthorized.

13. The method of claim 12 wherein validating further comprises balancing the inconsistencies of the vehicle component condition data of two or more vehicle components.

14. The method of claim 12 wherein validating further comprises:

determining a threshold number of inconsistencies for the vehicle component condition data of the one or more vehicle components; and determining if the number of inconsistencies exceeds the threshold.

15. The method of claim 11 wherein receiving vehicle component condition data further comprises receiving the vehicle component condition data over a wireless communication channel from the vehicle.

16. The method of claim 15 wherein the wireless communication channel is WiFi.

17. The method of claim 11 wherein the vehicle component condition data is received based on a triggering event.

18. A method comprising:

receiving at least one key-on and at least one key-off event signal;

receiving key-on vehicle system state non-location data and actual/estimated key-off vehicle system state non-location data upon receipt of the respective event signals;

comparing the key-on and key-off system state non-location data;

identifying a data inconsistency based on the comparison;

generating an alert signal based on the inconsistency; and transmitting the vehicle data or the alert signal to a remote terminal.

19. The method of claim 18 wherein the actual or estimated key-off vehicle system state non-location data is historical vehicle system state data.

20. The method of claim 18 wherein the identifying step includes identifying the inconsistencies of the vehicle system state non-location data for a plurality of vehicle components.

21. The method of claim 18 wherein the vehicle system state data is state data pertaining to at least one of wheel orientation, vehicle inclination, vehicle direction, odometer reading, engine off time, vehicle sensor history, OBD II monitor status, a battery state of charge, vehicle mass, fuel gauge status, engine coolant status, transmission fluid status, exhaust system temperatures, tire pressure monitor system (TPMS) receive hit rates, TPMS tire air temperature, internal vehicle clock status, and conditions detected from an external camera of the vehicle.

* * * * *